June 24, 1969   F. J. FUCHS, JR   3,451,241

METHODS OF HYDROSTATIC EXTRUSION

Filed Sept. 1, 1966

INVENTOR
*F. J. FUCHS, JR.*
BY *MARN & JANGARATHIS*
ATTORNEY

United States Patent Office 3,451,241
Patented June 24, 1969

3,451,241
METHODS OF HYDROSTATIC EXTRUSION
Francis Joseph Fuchs, Jr., Princeton Junction, N.J., assignor to Western Electric Company, Incorporated, New York, N.Y., a corporation of New York
Filed Sept. 1, 1966, Ser. No. 576,577
Int. Cl. B21c 23/21, 33/00, 31/00
U.S. Cl. 72—60                                    13 Claims

ABSTRACT OF THE DISCLOSURE

Method of extruding solid plastic material by subjecting only the sides of the material to high hydrostatic pressure sufficiently great to cause the material to increase in ductility, and by extruding the increasingly ductile material by the aforesaid high hydrostatic pressure. The end of a billet of solid plastic material is restrained to substantially neutralize any longitudinal forces acting on the billet and to substantially eliminate contact force between the billet and the die.

---

Figure 2:
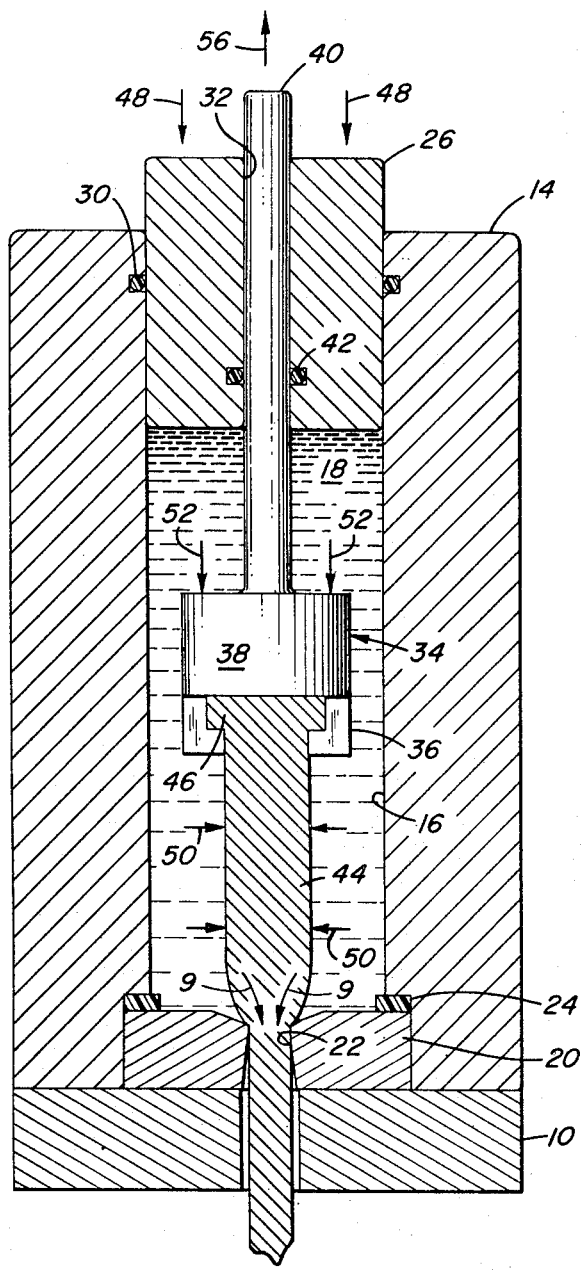

This invention relates generally to a method of hydrostatic extrusion and, more particularly, to a method of extruding solid plastic material through an extrusion die by means of high hydrostatic pressure effectively applied only to the sides of such material.

It is known in the hydrostatic extrusion art that many metals and other materials have greatly increased capacity for deformation, without fracture, if they are subjected to high hydrostatic pressure sufficiently high to increase their ductility, such metals and other materials being known, accordingly, as "solid plastic materials."

Typically, in the past, such high hydrostatic pressure has been employed to extrude solid plastic material by the process of subjecting such material uniformly, i.e., both the top and sides, to a high hydrostatic pressure, and forcing such material through an extrusion die by means of such uniformly applied hydrostatic pressure; such uniformly applied hydrostatic pressure having both longitudinal and radial components acting on the solid plastic material.

In some prior art hydrostatic extrusion processes, an additional longitudinally applied force, a pulling or pushing force, is employed to assist the longitudinal component of the hydrostatic pressure in forcing the solid plastic material through the extrusion die.

It has been recognized that when the applied high hydrostatic pressure has placed the solid plastic material in a state of high ductility, the longitudinally applied forces, together with the radially applied forces, tend to cause shearing stresses and even actual shearing between portions of the ductile material. This problem is particularly acute at the point where the ductile material passes through the extrusion die. At this point, such shearing tendency can cause faults, fissures or cleavages in the extruded material, sometimes referred to as chip formations, which can be so severe as to ruin the extruded product.

Accordingly, it is the primary object of this invention to provide a method of hydrostatic extrusion wherein such shearing stresses are eliminated.

It has been found that the benefits and advantages of hydrostatic extrusion can be utilized if the longitudinally applied high hydrostatic forces are effectively eliminated, or prevented from acting on the solid plastic material, and only the radially applied high hydrostatic forces are utilized to perform the extrusion.

Accordingly, a feature of the present invention is a method of hydrostatic extrusion which includes the steps of subjecting only the sides of a body of solid plastic material to high hydrostatic pressure sufficiently high to increase the ductility of the material, and forcing the material through an extrusion die solely by means of such high hydrostatic pressure.

Another feature of the present invention is a method of hydrostatic extrusion wherein longitudinally acting high hydrostatic forces are effectively eliminated and only radially applied high hydrostatic forces are utilized to perform extrusion.

Still another feature of the present invention is a method of hydrostatic extrusion which includes the step of restraining one end of the solid plastic material to eliminate, or effectively eliminate, the effect of longitudinal hydrostatic forces and thereby eliminate, or effectively eliminate, any tendency toward shearing between portions of the ductile solid plastic material.

It has been further found that other benefits and advantages of hydrostatic extrusion can be realized if a substantial portion of longitudinally applied high hydrostatic forces are neutralized, and the resultant forces are utilized to perform the extrusion.

Accordingly, another feature of the present invention is a method of hydrostatic extrusion which includes the steps of applying high hydrostatic pressure to a body of solid plastic material which pressure produces longitudinal and radial forces in the body, neutralizing a substantial portion of the longitudinal forces, and extruding the body through a die by means of the resultant forces applied to the body.

Figure 1:
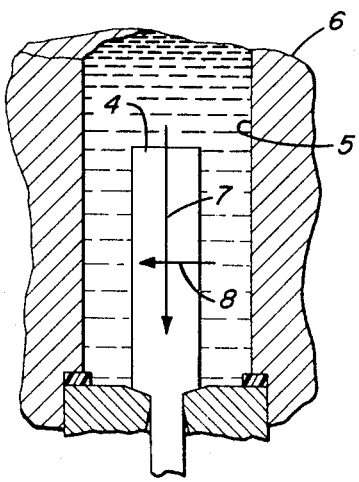

An even more complete understanding of the present invention may be obtained from the following detailed description of the invention when read in conjunction with the appended drawings, wherein:

FIG. 1 is a diagrammatic representation, in cross section, for assisting in the explanation of the shearing tendency problem, which problem the method of the present invention solves; and FIG. 2 is a diagrammatic, cross-sectional representation of structure for assisting in the explanation of the present invention, and suitable for the practice of the method of the present invention.

Referring now to FIG. 1, there is shown structure representative of the prior art method of hydrostatic extrusion. A billet of solid plastic material 4 is placed in a fluid filled, high pressure chamber 5 formed in a high pressure vessel 6. The fluid is suitably pressurized, such as by a piston being forced into the pressure chamber, and the billet 4 is subjected to high hydrostatic pressure applied uniformly to both the top and sides of the billet. The applied high hydrostatic pressure, or force, can be considered to be comprised of longitudinal components, represented by the arrow 7, and radial components, represented by the arrow 8. The point of intersections of the arrows is representative of shearing stresses produced by the co-action of both the longitudinal and radial components of the high hydrostatic pressure. Such shearing stresses, as mentioned above, tend to produce faults, fissures and cleavages in the material made ductile by the high hydrostatic pressure, and such tendency toward shearing is particularly acute where the extruded material passes through the extrusion die. At this point, the shearing stresses can cause what is commonly called "chip formation" to occur in the extruded material, which can become so severe as to be ruinous.

As stated above, it has been discovered that hydrostatic extrusion can be accomplished, and the shearing tendency eliminated, if the solid plastic material is subjected solely to radially applied hydrostatic forces to place the solid plastic material in a desired state of ductility, and to force the material through an extrusion die. Such radially applied hydrostatic forces cause a smooth curved flow of the material, as represented by the curved arrows 9 in FIG. 2, without the production of shearing stresses.

Generally, a billet of solid plastic material to be extruded by hydrostatic extrusion will be below the surface of the fluid applying the hydrostatic pressure, and the billet will have longitudinally acting forces applied thereto. However, it has been discovered, that if such longitudinally applied, or acting, hydrostatic forces are effectively eliminated, and only the radially applied hydrostatic forces are utilized to achieve the desired state of material ductility and to force the ductile material through an extrusion die, hydrostatic extrusion of very high quality can be accomplished, without the production of the unwanted shearing stresses.

Further, it has been discovered that if the top of the billet to be extruded is mechanically restrained, and if a longitudinal force of the proper magnitude is applied in a direction opposite to the longitudinal component of the applied high hydrostatic pressure, the longitudinal hydrostatic force component is effectively eliminated and, hence, the unwanted shearing stresses are eliminated. Aud, further, that the ductility of the billet can be increased to the desired state and the increasingly ductile billet can be forced through an extrusion die, solely with radially applied hydrostatic forces.

Such method of hydrostatic extrusion will now be described in connection with the diagrammatic structural representation of FIG. 2.

Referring now to FIG. 2, there is shown a base 10 to which is suitably secured, typically in removable fashion, a high pressure vessel 14 which is provided with a centrally formed high pressure chamber 16 filled with a suitable fluid 18 capable of transmitting hydrostatic stress.

An extrusion die 20 is suitably supported by the base 10 internally of, and at one end of, the high pressure vessel 14. The extrusion die is provided with a centrally formed, generally frustoconically shaped bore 22 for accommodating extruded material passing through the extrusion die. A high pressure seal 24 forms a mechanical interface between the extrusion die 20 and the high pressure vessel 14, and prevents the fluid 18 from escaping out of the pressure chamber 16 upon an increase in the pressure of the fluid. The seal 24 may be one of several suitable high pressure seals known to the art, and could be, for example, made of Teflon whose characteristics are well known to those skilled in the art.

Mounted for slidable movement within the high pressure chamber 16, is an annularly shaped ram or piston 26 for applying pressure to the fluid 18 which fills the high pressure chamber. Surrounding the piston 26 is a high pressure seal 30 for preventing the escape of the fluid 18 from the pressure chamber 16; the seal 30 may be identical with, or similar to, the seal 24. The piston 26 is provided with a centrally formed bore or passageway 32.

Extending into the high pressure chamber 16 is a piston indicated by the general numerical designation 34. The piston is comprised of a collar portion 36, a block portion 38, and a rod 40. The rod 40 extends through the bore or passageway 32 formed in the ram 26, and is dimensioned for slidable movement within the bore. Surrounding the rod 40, intermediate of the bore 32, is a seal 42 also for preventing the escape of the fluid 18 from the pressure chamber 16; the seal 42 also being of some suitable material such as Teflon.

In the practice of the preferred embodiment of the method of the present invention, the billet 44 of solid plastic material to be extruded, is provided near one end with an enlarged head portion 46, for complementary engagement with the collar 36 of the piston 34. The other end of the billet is fed into the extrusion die 20.

Suitable downward force, such as provided by a conventional press and being represented by the arrows 48, is applied to the piston 26 to force the piston downwardly into the pressure chamber 16 to pressurized fluid 18.

The pressurized fluid subjects the sides of the billet 44 to high hydrostatic pressure, the arrows 50 representing the application of radially applied high hydrostatic forces, and, since the piston block portion 38 and the billet 44 are beneath the surface of the pressurized fluid 18, downwardly acting, high hydrostatic forces, represented by the arrows 52, tend to apply longitudinally acting forces to the billet 44.

However, a predetermined upwardly acting force, or opposition force, represented by the arrow 56, is applied to the piston rod 40, and such force 56 is of the proper magnitude to cancel out, eliminate, or effectively eliminate, the net downwardly acting, longitudinal hydrostatic force represented by the arrows 52. Thus, the aforementioned shearing stresses are effectively eliminated, and the billet of solid plastic material 44 is subjected solely to radially applied high hydrostatic pressure or forces. However, it will be understood by those skilled in the art, that the resultant of the longitudinal forces indicated by the oppositely directed arrows 52 and 56, is a small downward longitudinal force sufficient only to cause the billet 44 to maintain engagement with the extrusion die 20. Thus, in this context, it will be understood that the billet 44 is subjected solely to radially applied high hydrostatic forces.

The radially applied high hydrostatic forces place the billet of solid plastic material in the desired state of ductility, and since the top of the billet is mechanically restrained as described above, the now ductile solid plastic material takes the path of least resistance and the radially applied high hydrostatic forces, force the ductile solid plastic material through the extrusion die 20.

Thus, it will be appreciated by those skilled in the art, that by the employment of the method of the present invention, sufficiently high hydrostatic pressure may be applied to a billet of solid plastic material to effect a substantial increase in ductility, which, coupled with the elimination of the shearing stresses present in the prior art hydrostatic extrusion processes, enables the rapid extrusion of the billet with extremely large reductions in area, in a single pass. For example, with the employment of the present method, copper billets have been cold extruded with up to 80% reduction of area in a single pass with high hydrostatic pressures ranging up to 100,000 p.s.i.

It will be further understood by those skilled in the art, that the magnitude of the upwardly acting or opposition force, indicated by the arrow 56 in FIG. 2, can be determined in any one of several ways. For example, the net longitudinal hydrostatic force acting downwardly on the billet, indicated by the arrows 52, can be calculated mathematically, and the opposite force 56 can be adjusted to be equal to, or substantially equal to, the force 52. Also, the magnitude of the force 56 can be determined empirically by performing a series of extrusions on a series of identical billets. The opposition force 56 can be adjusted to an arbitrarily chosen initial magnitude, an extrusion could be made and the quality of the extrudant observed. If the quality were too low, the amount of opposition force would be increased (perhaps increased in each of several successive extrusions) until the desired quality of extrudant were achieved. If the initial setting produced a satisfactory extrudant, the amount of opposition force could be decreased (perhaps in several successive extrusions) until the extrudant were not of the desired quality, and the oppositon force could then be adjusted back to a magnitude producing the desired quality of extrudant.

Referring again to the upwardly acting or opposition force 56, it will be understood by those skilled in the art, that the foregoing teaching of cancelling out, eliminating or effectively eliminating, the net applied, downwardly acting, longitudinal hydrostatic force 52 is qualitative illustration of the present invention, and that depending upon the quality of extrudant desired, or that which can be tolerated in a specific commercial application, the ratio of the opposition force 56 to the force 52 can vary. For example, if a comparatively reduced quality of extrudant were desired, or can be tolerated, the magnitude of the opposition force 56 can be adjusted so as to only neutralize a portion of the net applied, downwardly acting, longitudinal hydrostatic forces, and the billet can be extruded with the resultant forces applied to the billet.

It will be understood by those skilled in the art that the expression or term "high hydrostatic pressure" is a relative term connoting the understanding that, depending upon the hardness or brittleness of the solid plastic material to be extruded, various specific hydrostatic pressures must be obtained so as to cause the material to increase in ductility sufficiently to permit the material to be extruded without fracture.

Further, it will also be understood that the pressure fluid 18 can be any suitable pressure transfer medium, for example, even a suitable soft solid.

With regard to the mechanical interconnection provided by the piston collar 36 and the billet head 46, it will be understood that such arrangement is merely one of several suitable mechanical arrangements suitable for use in practicing the method of the present invention.

It is manifest to those skilled in the art that many modifications and variations may be made in the present invention without departing from the spirit and scope of the invention.

What is claimed is:

1. A method of extruding solid plastic material, which comprises the steps of:
   subjecting only the sides of said solid plastic material to high hydrostatic pressure sufficiently great to cause the material to increase in ductility, and
   extruding said increasingly ductile solid plastic material solely by means of said hydrostatic pressure.

2. A method of extruding solid plastic material, which comprises the steps of:
   subjecting said solid plastic material solely to radially applied high hydrostatic pressure sufficiently great to cause the material to increase in ductility, and
   extruding said increasingly ductile solid plastic material solely by said radially applied high hydrostatic pressure.

3. A method of extruding a body of solid plastic material through a die, comprising:
   applying high hydrostatic pressure to the body, said pressure producing longitudinal and radial forces in the body;
   applying another longitudinal force to the body in opposition to the longitudinal force produced therein by the high hydrostatic pressure; and
   extruding the body through the die by means of the resultant forces applied to the body.

4. A method of extruding a body of solid plastic material through a die, which comprises the steps of:
   applying high hydrostatic pressure to the body, said pressure producing longitudinal and radial forces in the body;
   neutralizing a substantial portion of said longitudinal forces; and
   extruding the body through the die by means of the resultant forces applied to the body.

5. A method of extruding solid plastic material, which comprises the steps of:
   applying high hydrostatic pressure to said solid plastic material,
   eliminating forces acting longitudinally on said solid plastic material as a result of said applied high hydrostatic pressure, and
   forcing said solid plastic material through an extrusion die with the remaining forces acting on said solid plastic material as a result of said applied high hydrostatic pressure.

6. A method according to claim 5 wherein said forces acting longitudinally are eliminated by mechanically restraining one end of said solid plastic material.

7. A method according to claim 6 wherein said remaining forces are forces acting solely on the sides of said solid plastic material.

8. A method of extruding solid plastic material, which comprises the steps of:
   subjecting said solid plastic material to high hydrostatic pressure, said hydrostatic pressure having longitudinal and radial components;
   applying another force to said solid plastic material of a direction and magnitude sufficient to effectively cancel the longitudinal component of said hydrostatic pressure; and
   forcing said solid plastic material through an extrusion die with said radial components.

9. A method according to claim 8 wherein said another force is a mechanical force applied longitudinally of said solid plastic material.

10. A method of extruding solid plastic material, which comprises the steps of:
    feeding one end of said solid plastic material into an extrusion die;
    surrounding the sides of said solid plastic material with a medium capable of transmitting hydrostatic stress;
    applying pressure to said medium to cause said medium to tend to apply high hydrostatic pressure to the top and sides of said solid plastic material, and to force said solid plastic material through said extrusion die; and
    applying a longitudinal force to said solid plastic material in a direction and of a magnitude such that only the hydrostatic pressure applied to the sides of said solid plastic material forces said solid plastic material through said extrusion die.

11. A method of extruding metal, which comprises the steps of:
    placing said metal to be extruded into a hydraulic chamber;
    feeding one end of said metal into an extrusion die associated with said chamber;
    securing the other end of said metal with means for applying a longitudinal force to said metal;
    surrounding said metal and a portion of said end securing means with a medium capable of transmitting hydrostatic stress;
    applying pressure to said medium in said chamber to cause said medium to apply hydrostatic pressure radially to said metal and to cause said hydrostatic pressure to tend to move said portion of said end securing means and said metal downwardly; and
    applying an upwardly acting longitudinal force to said end securing means of a magnitude such that the resultant downward force imparted by said hydrostatic pressure to said metal is sufficient only to cause said metal to maintain engagement with said extrusion die, and such that only the hydrostatic pressure applied radially to said metal effectively forces said metal through said extrusion die.

12. A method of extruding solid plastic material through an extrusion die, comprising the steps of:
  subjecting said material only to radially applied high hydrostatic pressure sufficiently great to cause said material to increase in ductility and to extrude said increasingly ductile material through said die, and
  substantially eliminating the force of contact between said material and said die.

13. A method of extruding solid plastic material through an extrusion die, comprising the steps of:
  subjecting said material to radially applied high hydrostatic pressure sufficiently great to cause said material to increase in ductility, and
  substantially eliminating the force of contact between said material and said die so as to extrude said material through said die substantially solely by said radially applied high hydrostatic pressure.

References Cited

UNITED STATES PATENTS

| | | | |
|---|---|---|---|
| 524,504 | 8/1894 | Robertson | 72—54 |
| 796,970 | 8/1905 | Hoopes. | |
| 2,558,035 | 6/1951 | Bridgman. | |
| 3,364,716 | 1/1968 | Averill | 72—253 |

FOREIGN PATENTS 476,793  9/1951  Canada.

RICHARD J. HERBST, *Primary Examiner.*

U.S. Cl. X.R.

72—271